United States Patent
Edamadaka et al.

(10) Patent No.: US 11,972,305 B2
(45) Date of Patent: Apr. 30, 2024

(54) CONTAINER APPLICATION FOR MICROSERVICES FRONT END DESKTOP

(71) Applicant: JPMorgan Chase Bank, N.A., New York, NY (US)

(72) Inventors: Rajeshwari Edamadaka, Allentown, NJ (US); Murali Pingali, New Albany, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 179 days.

(21) Appl. No.: 17/354,700

(22) Filed: Jun. 22, 2021

(65) Prior Publication Data
US 2022/0405152 A1 Dec. 22, 2022

(51) Int. Cl.
G06F 9/54 (2006.01)
G06F 9/451 (2018.01)
H04L 9/40 (2022.01)

(52) U.S. Cl.
CPC ............. *G06F 9/541* (2013.01); *G06F 9/451* (2018.02); *H04L 63/102* (2013.01)

(58) Field of Classification Search
CPC ......... G06F 9/541; G06F 9/451; H04L 63/102
See application file for complete search history.

(56) References Cited

U.S. PATENT DOCUMENTS

| 10,032,160 | B2 * | 7/2018 | Desai | G06Q 10/067 |
|---|---|---|---|---|
| 10,621,001 | B1 * | 4/2020 | Braverman | G06F 9/4881 |
| 11,163,622 | B1 * | 11/2021 | Aubert | G06F 16/9558 |
| 2015/0261774 | A1 | 9/2015 | McFerrin et al. | |
| 2017/0024100 | A1 | 1/2017 | Pieper et al. | |
| 2018/0367363 | A1 * | 12/2018 | Jaeger | H04L 41/022 |
| 2019/0354416 | A1 | 11/2019 | Schliefer et al. | |
| 2020/0327371 | A1 * | 10/2020 | Sharma | G06N 5/04 |
| 2020/0396225 | A1 * | 12/2020 | Bhatia | H04L 63/102 |
| 2021/0105340 | A1 * | 4/2021 | Grozdanov | G06F 8/76 |
| 2021/0248205 | A1 * | 8/2021 | Tank | G06F 16/986 |
| 2021/0328793 | A1 * | 10/2021 | Saravanan | G06F 21/53 |
| 2022/0171758 | A1 * | 6/2022 | Agrawal | G06F 16/2255 |

OTHER PUBLICATIONS

Srivastava, ("12+ Factors for Containerized UI Microservice", pp. 1-24 (Year: 2020).*
International Search Report and Written Opinion in corresponding International Application No. PCT/US2022/030898, dated Oct. 5, 2022.

* cited by examiner

*Primary Examiner* — Kevin L Young
*Assistant Examiner* — Phuong N Hoang
(74) *Attorney, Agent, or Firm* — GREENBLUM & BERNSTEIN, P.L.C.

(57) ABSTRACT

A method and a system for providing a container application for a servicing platform are provided. The method includes: displaying, at each of a plurality of workstations, a user interface; receiving, from a first user via the user interface, a first software application; receiving, from a second user via the user interface, a second software application; and facilitating a use of each of the first software application and the second software application by each of the first user, the second user, and at least a third user via a container application that provides access to a plurality of software applications. The user interface may include a microfront end that implements a plurality of microservices that correspond to a subset of the plurality of software applications.

20 Claims, 4 Drawing Sheets

CONTAINER APPLICATION FOR MICROSERVICES FRONT END DESKTOP

BACKGROUND

1. Field of the Disclosure

This technology generally relates to methods and systems for providing a container application, and more particularly to methods and systems for providing a container application for a microservices front end desktop platform in a contact center environment or any other environment where applications interact with each other and are centered around a customer or user interaction.

2. Background Information

For a large corporate organization that has many customers, customer service is an important aspect of the business operation. Customers typically expect service requests to be handled in a timely and accurate manner, and if the corporate organization fails to provide such customer service, there may be a negative effect on the reputation of that organization.

Many customer service requests are performed online via the Internet. For such requests, the corporate organization may utilize a contact center that facilitates the provision of various servicing applications from different parts of the organization. However, because of the variety of applications and the scale of the overall operation, software developers may encounter difficulties in integrating newly developed applications with other parts of the software suite that serve the contact center.

Accordingly, there is a need for methods and systems for providing a container application for a microservices front end desktop platform in a contact center environment.

SUMMARY

The present disclosure, through one or more of its various aspects, embodiments, and/or specific features or sub-components, provides, inter alia, various systems, servers, devices, methods, media, programs, and platforms for providing a container application for a microservices front end desktop platform in a contact center environment.

According to an aspect of the present disclosure, a method for providing a container application for a microservices front end desktop platform in a contact center environment is provided. The method is implemented by at least one processor. The method includes: displaying, by the at least one processor at each of a plurality of workstations, a user interface; receiving, by the at least one processor from a first user via the user interface, a first software application; receiving, by the at least one processor from a second user via the user interface, a second software application; and facilitating, by the at least one processor, a use of each of the first software application and the second software application by each of the first user, the second user, and at least a third user via a container application that provides access to a plurality of software applications.

The displaying of the user interface may include displaying a microfront end that implements a plurality of microservices that correspond to a subset of the plurality of software applications.

The facilitating may include providing, for each of the first software application and the second software application, an access authentication to each of the first user, the second user, and the third user.

The facilitating may include providing a communication context that enables a flow of communication between the first software application and the second software application.

The method may further include using a JavaScript application programming interface (API) and JavaScript events to facilitate the flow of communication.

The container application may include a container software development kit (SDK) that provides access to a JavaScript library and facilitates interactions among the plurality of software applications.

The plurality of software applications may include software applications that have at least one from among a Vue.js framework, a ReactJS framework, and an AngularJS framework.

The method may further include: when a customer call is received, routing, via the container application, information that relates to the received customer call to each of the plurality of software applications.

According to another exemplary embodiment, a computing apparatus for providing a container application for a servicing platform is provided. The computing apparatus includes a processor; a memory; and a communication interface coupled to each of the processor and the memory. The processor is configured to: display, at each of a plurality of workstations, a user interface; receive, from a first user via the user interface and the communication interface, a first software application; receive, from a second user via the user interface and the communication interface, a second software application; and facilitate a use of each of the first software application and the second software application by each of the first user, the second user, and at least a third user via a container application that provides access to a plurality of software applications.

The processor may be further configured to display a microfront end that implements a plurality of microservices that correspond to a subset of the plurality of software applications.

The processor may be further configured to provide, for each of the first software application and the second software application, an access authentication to each of the first user, the second user, and the third user.

The processor may be further configured to provide a communication context that enables a flow of communication between the first software application and the second software application.

The processor may be further configured to use a JavaScript application programming interface (API) and JavaScript events to facilitate the flow of communication.

The container application may include a container software development kit (SDK) that is configured to provide access to a JavaScript library and to facilitate interactions among the plurality of software applications.

The plurality of software applications may include software applications that have at least one from among a Vue.js framework, a ReactJS framework, and an AngularJS framework.

When a customer call is received, the processor may be further configured to route, via the container application, information that relates to the received customer call to each of the plurality of software applications.

According to yet another exemplary embodiment, a non-transitory computer readable storage medium storing instructions for providing a container application for a servicing platform is provided. The storage medium includes executable code which, when executed by a processor, causes the processor to: display, at each of a plurality of workstations, a user interface; receive, from a first user via the user interface, a first software application; receive, from a second user via the user interface, a second software application; and facilitate a use of each of the first software application and the second software application by each of the first user, the second user, and at least a third user via a container application that provides access to a plurality of software applications.

The executable code may be further configured to cause the processor to display a microfront end that implements a plurality of microservices that correspond to a subset of the plurality of software applications.

The executable code may be further configured to cause the processor to provide, for each of the first software application and the second software application, an access authentication to each of the first user, the second user, and the third user.

The container application may include a container software development kit (SDK) that provides access to a JavaScript library and facilitates interactions among the plurality of software applications.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
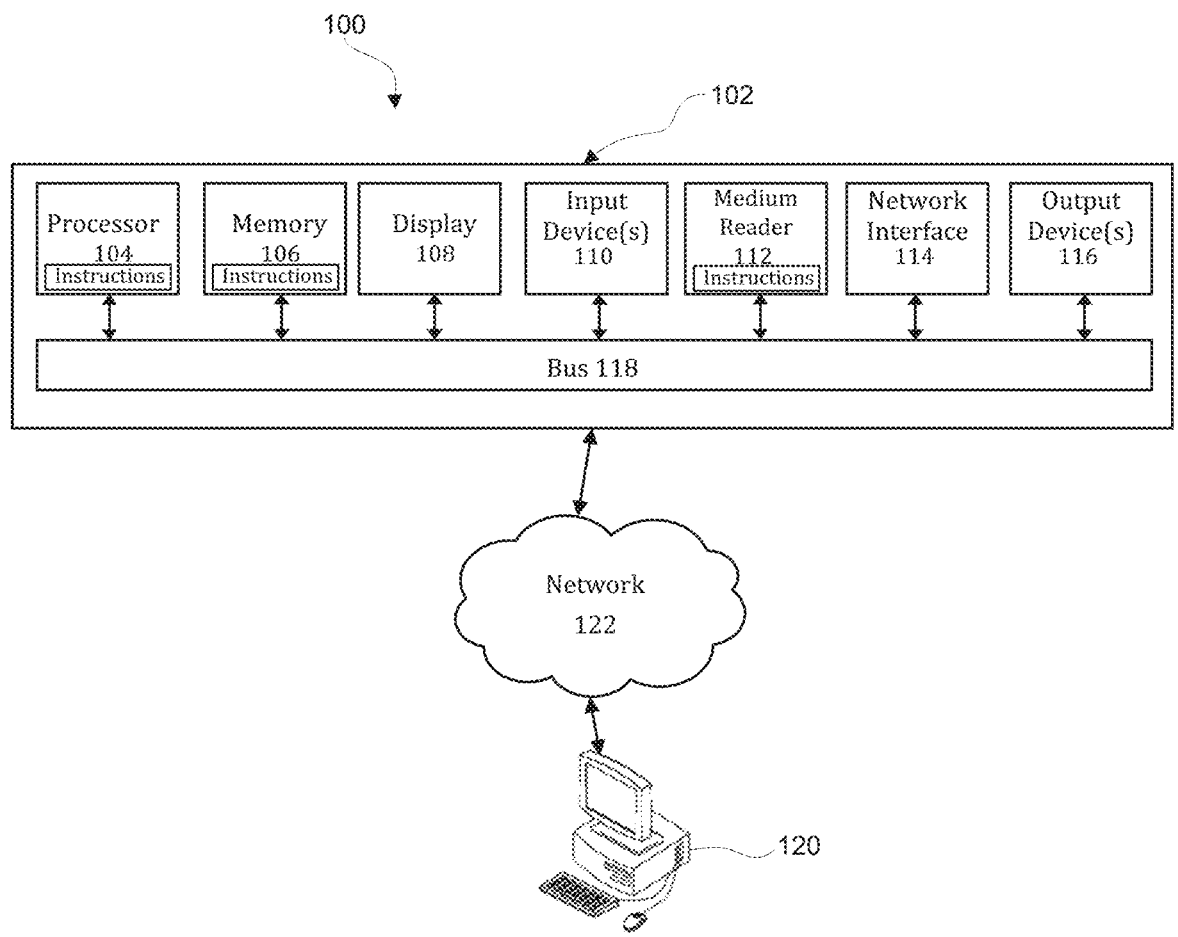
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time.

The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc. In an exemplary embodiment, the bus 118 may include an event bus between microfront ends that is a JavaScript eventing technology called as broadcast channels supported by modern browsers. There may also be eventing between server microservices and a container application, such as, for example, websockets that are delivered to one or more microfront ends. The server microservices may, in turn, use an eventing technology for other applications, such as, for example, Kafka.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing a container application for a microservices front end desktop platform in a contact center environment.

Figure 2:
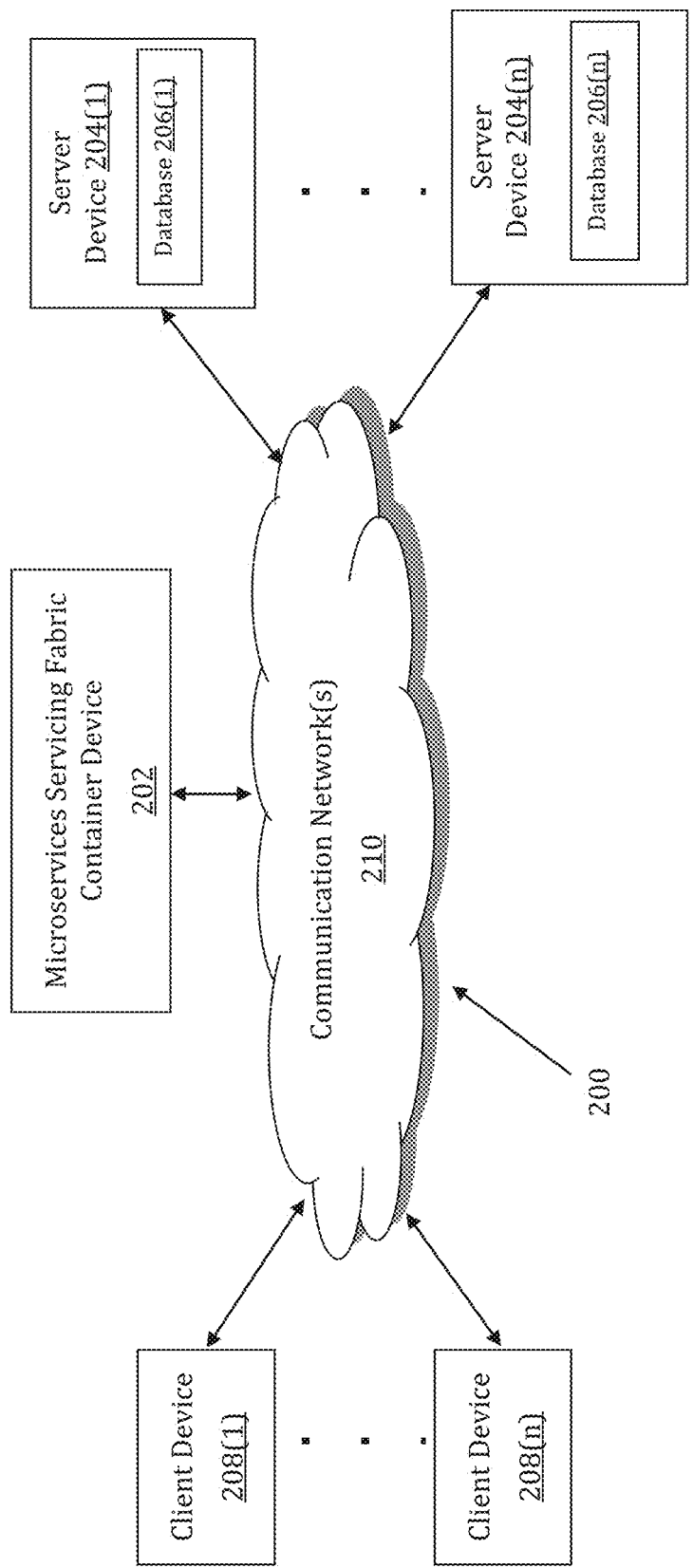
FIG. 2 illustrates an exemplary diagram of a network environment.

Referring to FIG. 2, a schematic of an exemplary network environment 200 for implementing a method for providing a container application for a microservices front end desktop platform in a contact center environment is illustrated. In an exemplary embodiment, the method is executable on any networked computer platform, such as, for example, a personal computer (PC).

The method for providing a container application for a microservices front end desktop platform in a contact center environment may be implemented by a Microservices Servicing Fabric Container (MSFC) device 202. The MSFC device 202 may be the same or similar to the computer system 102 as described with respect to FIG. 1. The MSFC device 202 may store one or more applications that can include executable instructions that, when executed by the MSFC device 202, cause the MSFC device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MSFC device 202 itself, may be located in virtual server(s) running in a cloud-based computing environment rather than being tied to one or more specific physical network computing devices. Also, the application(s) may be running in one or more virtual machines (VMs) executing on the MSFC device 202. Additionally, in one or more embodiments of this technology, virtual machine(s) running on the MSFC device 202 may be managed or supervised by a hypervisor. In an exemplary embodiment, microfront end applications may be web components or Iframes or thick applications running on a desktop.

In the network environment 200 of FIG. 2, the MSFC device 202 is coupled to a plurality of server devices 204(1)-204(n) that hosts a plurality of databases 206(1)-206(n), and also to a plurality of client devices 208(1)-208(n) via communication network(s) 210. A communication interface of the MSFC device 202, such as the network interface 114 of the computer system 102 of FIG. 1, operatively couples and communicates between the MSFC device 202, the server devices 204(1)-204(n), and/or the client devices 208(l)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MSFC device 202, the server devices 204(1)-204(n), and/or the client devices 208(1)-208(n) may be coupled together via other topologies. Additionally, the network environment 200 may include other network devices such as one or more routers and/or or switches, for example, which are well known in the art and thus will not be described herein. This technology provides a number of advantages including methods, non-transitory computer readable media, and MSFC devices that efficiently implement a method for providing a container application for a microservices front end desktop platform in a contact center environment.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. In an exemplary embodiment, a servicing fabric may abstract various types of customer communication, including voice calls, video calls, email, chat, cobrowse, etc. by using an event-driven architecture that interfaces with different telephony systems and then normalizes and communicates these various communication channels as omni-channel customer interactions to a container application.

The MSFC device 202 may be a standalone device or integrated with one or more other devices or apparatuses, such as one or more of the server devices 204(1)-204(n), for example. In one particular example, the MSFC device 202 may include or be hosted by one of the server devices 204(1)-204(n), and other arrangements are also possible. Moreover, one or more of the devices of the MSFC device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MSFC device 202 via the communication network(s) 210 according to the HTTP-based and/or JavaScript Object Notation (JSON) methodology for conveying objects over a REST protocol or a websocket protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to container-specific software compatibility and interaction servicing data that relates to services provided to customers via the contact center. The container application persistence includes container layouts and microfront end applications in the layout, per container administrator. In an exemplary embodiment, multiple container administrators managing multiple layouts may be supported, similar to a multi-tenant application.

Although the server devices 204(1)-204(n) are illustrated as single devices, one or more actions of each of the server devices 204(1)-204(n) may be distributed across one or more distinct network computing devices that together comprise one or more of the server devices 204(1)-204(n).

Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the MSFC device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone, a tablet, or a kiosk, as may be used in a bank branch office or a retail outlet.

The client devices 208(1)-208(n) may run interface applications, such as standard web browsers or standalone client applications, which may provide an interface to communicate with the MSFC device 202 via the communication network(s) 210 in order to communicate user requests and information. The client devices 208(1)-208(n) may further include, among other features, a display device, such as a display screen or touchscreen, and/or an input device, such as a keyboard, for example. In an exemplary embodiment, a container application may support web browser applications and/or native/thick applications that run on a client device 208(x), such as, for example, any one or more of a Visual C#application, a Visual C++ application, a Visual Basic application, and/or remotely hosted applications such as SalesForce.

Although the exemplary network environment 200 with the MSFC device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MSFC device 202, the server devices 204(1)-204(n), or the client devices 208(1)-208(n), for example, may be configured to operate as virtual instances on the same physical machine. In other words, one or more of the MSFC device 202, the server devices 204(1)-204(n), or the client devices 208(1)-208(n) may operate on the same physical device rather than as separate devices communicating through communication network(s) 210. Additionally, there may be more or fewer MSFC devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof. Resiliency for a container application is provided through the following: 1) Multiple instances of the container service, in multiple pools or availability zones, and multiple data centers, used in conjunction with a Global Load Balancer that acts as a front end; 2) resiliency handling in the container and a container software development kit (SDK) for event sources, such as from interaction servicing fabric microservices; and 3) websocket resiliency and rest service resiliency.

Figure 3:
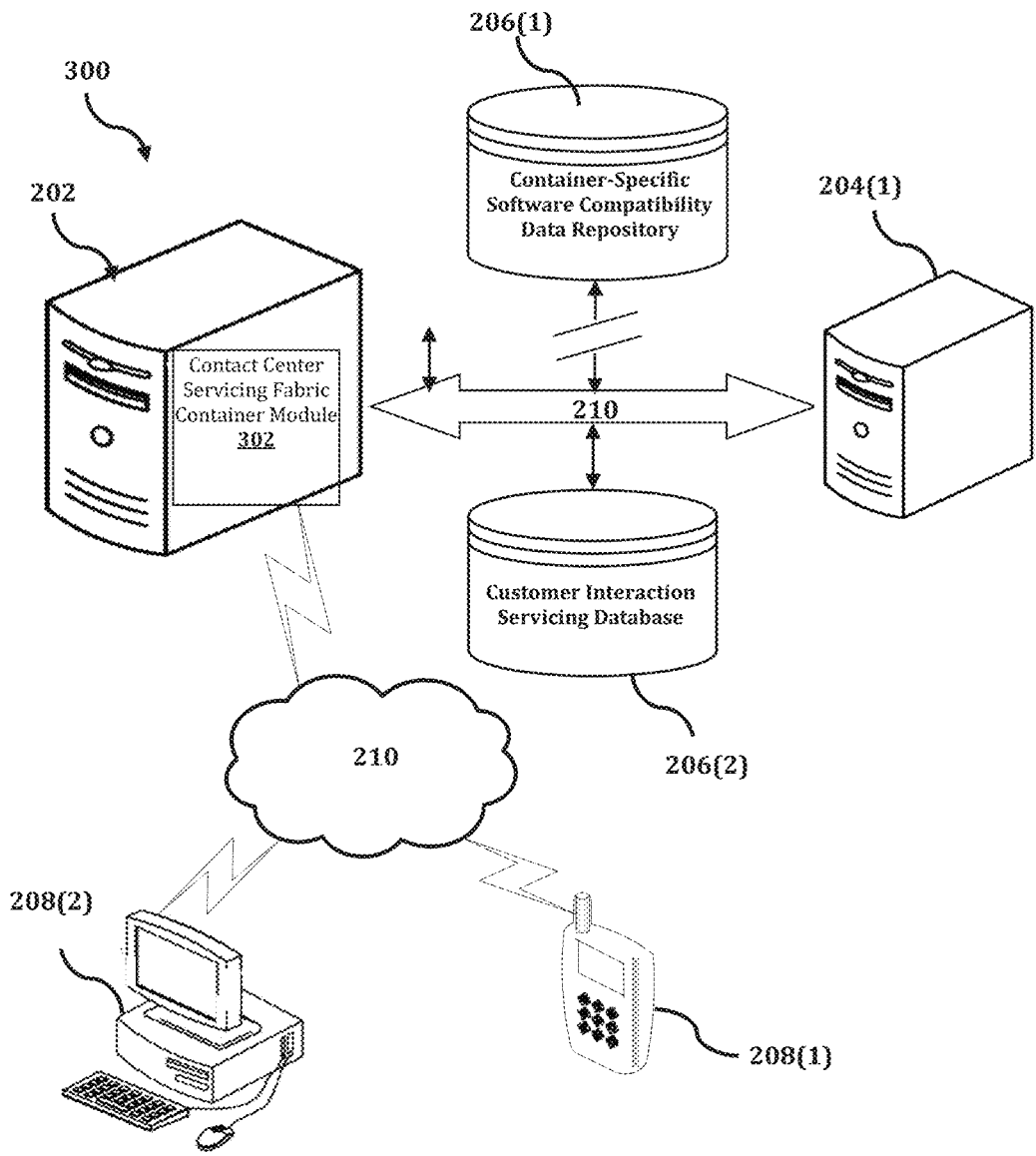
FIG. 3 shows an exemplary system for implementing a method for providing a container application for a microservices front end desktop platform in a contact center environment.

The MSFC device 202 is described and illustrated in FIG. 3 as including a contact center servicing fabric container module 302, although it may include other rules, policies, modules, databases, or applications, for example. As will be described below, the contact center servicing fabric container module 302 is configured to implement a method for providing a container application for a microservices front end desktop platform in a contact center environment.

In an exemplary embodiment, the container application provides a list of container capabilities, including the following: 1) Accommodates any framework (Vue.js, React, Angular, etc.) as web components or iFrames. 2) Provides OAUTH2, authentication and authorization. 3) Framework agnostic SDK for widgets. 4) Lifecycle events: login/logout/timeouts. 5) Seamless High Availability (HA)/Resiliency. 6) Seamless Login across different Seal Identifications. 7) Dynamically loads layout based on role. 8) Dynamically loads widgets (i.e., Gaia-hosted applications). 9) Provides inter-component eventing. 10) Websocket eventing. 11) Access to Praesto interactive servicing fabric (ISF) (i.e., omni-channel target state contact center) capabilities. 12) Application ID for each microfront end and roles for each layout and applications.

In an exemplary embodiment, each application specification includes: 1) id": 1605716178245, (i.e., random ID generated by container administrator based on epoch). 2) "name": "oc-brand-bar", (i.e., user supplied name). 3) "description": "oc-brand-bar", (i.e., user supplied description). 4) "tag": "oc-brand-bar", (i.e., name given to web component in html tag). 5) "jsUrl": "oc-brandbar.apps-.dev.domain.net/src/component/BrandBarComponent.js",
(i.e., URL to JS file). 6) "microfrontendUrl":"oc-brandbar.apps.dev.domain.net" (i.e., web URL where component loads by itself). 7) "mode".

In an exemplary embodiment, each layout has the following and a publish-URL:Layouts can also be extended with event-related actions that can include changing to another layout (i.e., dynamic layouts):

[
    { → each layout

-continued

```
    "id": 1608066754610,
    "created": "12/15/2020, 9:12:34 PM",
    "name": "one-view",
    "description": "one-view",
    "role": "SPECIALIST",
    "frames": [
        { → each application
            "key": "1608066714386",
            "type": "component",
            "title": "ov-brand-bar",
            "url": "ov-
brandbar.apps.dev.domain.net/src/component/BrandBarCompon
ent.js",
            "mode": "Web Component",
            "html": "<script type=\"text/javascript\" src=\"ov-
brandbar.apps.dev.domain.net/src/component/BrandBarCompon
ent.js\"></script>\n<ov-brand-bar></ov-brand-bar>",
            "componentName": "ov-brand-bar",
            "isClosable": false,
            "header": {
            "popout": false
            "contextAlias":"ccworkspace"
            "publishUrl":"container.abc.co/ccworkspace
            "allowedRoles"=[CCSPECIALIST, CCSUPERVISOR, ...]
            "eventTriggers" = {
                [eventName:"event1", layoutName:"layout1"],
                [eventName:"event2", layoutName:"layout2"],
                [eventName:"event3", layoutName:"layout3"],
                [eventName:"event4", layoutName:"layout4"],
            }
    }
```

An exemplary process 300 for implementing a mechanism for providing a container application for a microservices front end desktop platform in a contact center environment by utilizing the network environment of FIG. 2 is illustrated as being executed in FIG. 3. Specifically, a first client device 208(1) and a second client device 208(2) are illustrated as being in communication with MSFC device 202. In this regard, the first client device 208(1) and the second client device 208(2) may be "clients" of the MSFC device 202 and are described herein as such. Nevertheless, it is to be known and understood that the first client device 208(1) and/or the second client device 208(2) need not necessarily be "clients" of the MSFC device 202, or any entity described in association therewith herein. Any additional or alternative relationship may exist between either or both of the first client device 208(1) and the second client device 208(2) and the MSFC device 202, or no relationship may exist.

Further, MSFC device 202 is illustrated as being able to access a container-specific software compatibility data repository 206(1) and a customer interaction servicing database 206(2). The contact center servicing fabric container module 302 may be configured to access these databases for implementing a method for providing a container application for a microservices front end desktop platform in a contact center environment.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the MSFC device 202 via broadband or cellular communication. Of course, these embodiments are merely exemplary and are not limiting or exhaustive.

Upon being started, the contact center servicing fabric container module 302 executes a process for providing a container application for a microservices front end desktop platform in a contact center environment. In an exemplary embodiment, the starting point is using an administration aspect of the container application, through which a container manager administrator can create layouts and specify applications and various other details in the layouts, and then publish the layout. This then leads to a user loading the layout through the published Uniform Resource Indicator (URI) and then accessing the specific layout with microfront end applications as loaded by the container application. An exemplary process for providing a container application for a microservices front end desktop platform in a contact center environment is generally indicated at flowchart 400 in FIG. 4.

Figure 4:
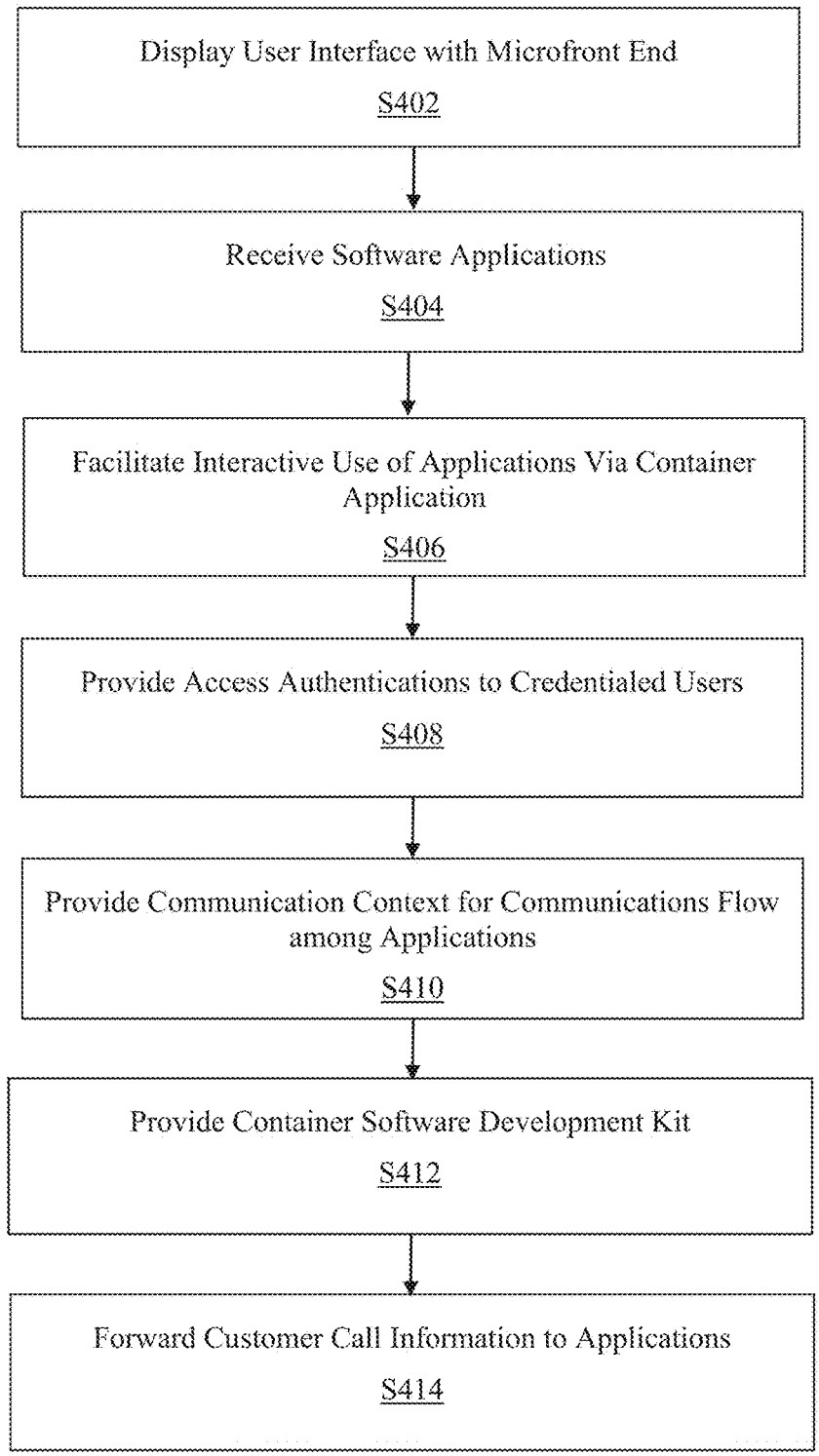
FIG. 4 is a flowchart of an exemplary process for implementing a method for providing a container application for a microservices front end desktop platform in a contact center environment.

In process 400 of FIG. 4, at step S402, the contact center servicing fabric container module 302 displays a user interface at each of a plurality of workstations that correspond to users of a container application that provides access to a plurality of software applications that are utilized in a contact center environment. In an exemplary embodiment, each displayed user interface includes a microfront end that implements a plurality of microservices that correspond to a subset of the plurality of software applications. The container is a runtime, extensible loader that allows teams to develop applications in their own seal identifications and at their own pace.

At step S404, the contact center servicing fabric container module 302 receives software applications from users that wish to integrate these software applications into the container for subsequent use in the contact center environment. In an exemplary embodiment, the software applications may have any of a Vue.js framework, a ReactJS framework, and/or an AngularJS framework.

At step S406, the contact center servicing fabric container module 302 facilitates interactive use of the software applications that are integrated into the container. In this aspect, all users that have access to the container are able to make effective use of the applications contained therein.

At step S408, the contact center servicing fabric container module 302 provides access authentications to credentialed users. In this aspect, when a user desires to access an application from within the container, the user may be prompted to provide a credential that proves that the user is authorized to access the application, and upon confirmation that the credential has been provided, the user may receive an access authentication. In an exemplary embodiment, the access authentications relate to roles specified in a container layout specification, and for any particular user, only the microfront ends where the particular user has the allowed roles are displayed to that particular user.

At step S410, the contact center servicing fabric container module 302 provides a communication context for communications flow among the applications contained in the container. The flow of communication may be facilitated by using a JavaScript (JS) application programming interface (API) and JS events. In an exemplary embodiment, the context is of a customer communication, such as, for example, a call that has been answered by a contact center agent, who then uses the container to interact with many microfront ends, each of which needs the corresponding communication metadata to appropriately load up the information that is relevant for that customer. This model can be extended to other use cases where the context may be for a past customer interaction, a case or account in another office, or any other suitable situation. The communication context flow can arrive at the beginning of a call, or can be during a call when one microfront end launches and/or transitions to another microfront end. For example, a specialist is able to move from assisting a customer with his/her credit card (i.e., a first microfront end) to assisting the customer with his/her savings account (i.e., a second microfront end).

At step S412, the contact center servicing fabric container module 302 provides a container software development kit (SDK) that provides access to a JavaScript library. The container SDK assists users that are in the process of developing new applications that may eventually be introduced into the container. The container SDK facilitates interactions among the applications in the container, and also facilitates other capabilities, such as container lifecycle events, passing events from server-side applications, and providing an interaction servicing fabric that delivers a customer call to a specialist.

At step S414, the contact center servicing fabric container module 302 forwards customer call information to the applications that are contained in the container. In this regard, when a customer call is received, information about the caller and the reason for the call may be determined, and the information is then routed to various applications in order to service the call. Similarly, one microfront end may send events using the container SDK to other microfront ends, i.e., web components within the same browser or an embedded iframe or a child window or a thick application using an event bridge between the container and the various microfront ends. It is also possible to send a request from one microfront end to another, i.e., events styled to represent a request-response sequence. This may result in one microfront end causing a change in another microfront end. The events can be exchanged between the container and the microfront end, or vice versa. Events from microfront end to container may also trigger a layout change.

Accordingly, with this technology, an optimized process for providing a container application for a microservices front end desktop platform in a contact center environment is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for providing a container application for a servicing platform, the method being implemented by at least one processor, the method comprising:
    displaying, by the at least one processor at each of a plurality of workstations that correspond to users of a container application for use in a contact center environment, a user interface;
    receiving, by the at least one processor from a first workstation of a first user via the user interface, a first software application configured to be integrated with the container application for use in the contact center environment;
    receiving, by the at least one processor from a second workstation of a second user via the user interface, a second software application configured to be integrated with the container application for use in the contact center environment, wherein the second software application is received contemporaneously with the first software application;
    receiving, by the at least one processor from a third user via the user interface, a request to access at least one of the first software application provided by the first user and the second software application provided by the second user;
    configuring, by the at least one processor, the container application to allow access to the first software application and the second software application via the container application, wherein the container application allows access to a plurality of software applications;
    routing, by the at least one processor, the third user to the container application to access one of the first software application or the second software application;
    facilitating, by the at least one processor, a use of each of the first software application and the second software application by each of the first user, the second user, and the third user via the container application; and
    displaying, by the at least one processor, to the third user one or more microfront ends for the one of the first software application or the second software application,
    wherein only microfront ends where the third user has allowed roles are displayed, and
    wherein the container application is a single application and includes each of a plurality of container capabilities including: (1) accommodation of any framework as web components, (2) provision of OAUTH2 authentication and authorization, (3) framework agnostic software development kit (SDK) for widgets, (4) lifecycle events, (5) seamless high availability (HA)/resiliency, (6) seamless login across different seal identifications, (7) dynamically loads layout based on a role, (8) dynamically loads the widgets, (9) provides inter-component eventing, (10) websocket eventing, (11) access to Praesto interactive servicing fabric (ISF) capabilities, and (12) application ID for each microfront end and roles for each layout and applications.

2. The method of claim 1, wherein the displaying of the user interface comprises displaying a microfront end that implements a plurality of microservices that correspond to a subset of the plurality of software applications.

3. The method of claim 1, wherein the facilitating comprises providing, for each of the first software application and the second software application, an access authentication to each of the first user, the second user, and the third user.

4. The method of claim 1, wherein the facilitating comprises providing a communication context that enables a flow of communication between the first software application and the second software application.

5. The method of claim 4, further comprising using a scripting language application programming interface (API) and scripting language events to facilitate the flow of communication.

6. The method of claim 1, wherein the container application includes a container software development kit (SDK) that provides access to a scripting language library and facilitates interactions among the plurality of software applications.

7. The method of claim 1, wherein the plurality of software applications includes software applications that includes a scripting framework.

8. The method of claim 1, further comprising:
    when a customer call is received, routing, via the container application, information that relates to the received customer call to each of the plurality of software applications.

9. A computing apparatus for providing a container application for a servicing platform, the computing apparatus comprising:
    a processor;
    a memory stores instructions; and
    a communication interface coupled to each of the processor and the memory,
    wherein the processor executes the instructions to perform:
        displaying, at each of a plurality of workstations that correspond to users of a container application for use in a contact center environment, a user interface;
        receiving, from a first workstation of a first user via the user interface and the communication interface, a first software application configured to be integrated with the container application for use in the contact center environment;

receiving, from a second workstation of a second user via the user interface and the communication interface, a second software application configured to be integrated with the container application for use in the contact center environment, wherein the second software application is received contemporaneously with the first software application;

receiving, by the at least one processor from a third user via the user interface, a request to access at least one of the first software application provided by the first user and the second software application provided by the second user;

configuring, by the at least one processor, the container application to allow access to the first software application and the second software application via the container application, wherein the container application allows access to a plurality of software applications;

routing, by the at least one processor, the third user to the container application to access one of the first software application or the second software application;

facilitating a use of each of the first software application and the second software application by each of the first user, the second user, and the third user via the container application; and displaying, by the at least one processor, to the third user one or more microfront ends for the one of the first software application or the second software application, wherein only microfront ends where the third user has allowed roles are displayed, and wherein the container application is a single application and includes each of a plurality of container capabilities including: (1) accommodation of any framework as web components, (2) provision of OAUTH2 authentication and authorization, (3) framework agnostic software development kit (SDK) for widgets, (4) lifecycle events, (5) seamless high availability (HA)/resiliency, (6) seamless login across different seal identifications, (7) dynamically loads layout based on a role, (8) dynamically loads the widgets, (9) provides inter-component eventing, (10) websocket eventing, (11) access to Praesto interactive servicing fabric (ISF) capabilities, and (12) application ID for each microfront end and roles for each layout and applications.

10. The computing apparatus of claim 9, wherein the processor further performs displaying a microfront end that implements a plurality of microservices that correspond to a subset of the plurality of software applications.

11. The computing apparatus of claim 9, wherein the processor further performs providing, for each of the first software application and the second software application, an access authentication to each of the first user, the second user, and the third user.

12. The computing apparatus of claim 9, wherein the processor further performs providing a communication context that enables a flow of communication between the first software application and the second software application.

13. The computing apparatus of claim 12, wherein the processor further performs using a scripting language application programming interface (API) and scripting language events to facilitate the flow of communication.

14. The computing apparatus of claim 9, wherein the container application includes a container software development kit (SDK) that is configured to provide access to a scripting language library and to facilitate interactions among the plurality of software applications.

15. The computing apparatus of claim 9, wherein the plurality of software applications includes software applications that includes a scripting framework.

16. The computing apparatus of claim 9, wherein when a customer call is received, the processor further performs routing, via the container application, information that relates to the received customer call to each of the plurality of software applications.

17. A non-transitory computer readable storage medium storing instructions for providing a container application for a servicing platform, the storage medium comprising executable code which, when executed by a processor, causes the processor to:

display, at each of a plurality of workstations that correspond to users of a container application for use in a contact center environment, a user interface;

receive, from a first workstation of a first user via the user interface, a first software application configured to be integrated with the container application for use in the contact center environment;

receive, from a second workstation of a second user via the user interface, a second software application configured to be integrated with the container application for use in the contact center environment, wherein the second software application is received contemporaneously with the first software application;

receive, from a third user via the user interface, a request to access at least one of the first software application provided by the first user and the second software application provided by the second user;

configure the container application to allow access to the first software application and the second software application via the container application, wherein the container application allows access to a plurality of software applications;

route the third user to the container application to access one of the first software application or the second software application;

facilitate a use of each of the first software application and the second software application by each of the first user, the second user, and the third user via the container application; and display, to the third user, one or more microfront ends for the one of the first software application or the second software application, wherein only microfront ends where the third user has allowed roles are displayed, and wherein the container application is a single application and includes each of a plurality of container capabilities including: (1) accommodation of any framework as web components, (2) provision of OAUTH2 authentication and authorization, (3) framework agnostic software development kit (SDK) for widgets, (4) lifecycle events, (5) seamless high availability (HA)/resiliency, (6) seamless login across different seal identifications, (7) dynamically loads layout based on a role, (8) dynamically loads the widgets, (9) provides inter-component eventing, (10) websocket eventing, (11) access to Praesto interactive servicing fabric (ISF) capabilities, and (12) application ID for each microfront end and roles for each layout and applications.

18. The storage medium of claim 17, wherein the executable code is further configured to cause the processor to display a microfront end that implements a plurality of microservices that correspond to a subset of the plurality of software applications.

19. The storage medium of claim 17, wherein the executable code is further configured to cause the processor to provide, for each of the first software application and the second software application, an access authentication to each of the first user, the second user, and the third user.

20. The storage medium of claim 17, wherein the container application includes a container software development kit (SDK) that provides access to a scripting language library and facilitates interactions among the plurality of software applications.

* * * * *